Oct. 2, 1934.    M. TIBBETTS    1,975,626
TRANSMISSION CONTROL MECHANISM
Filed May 1, 1930
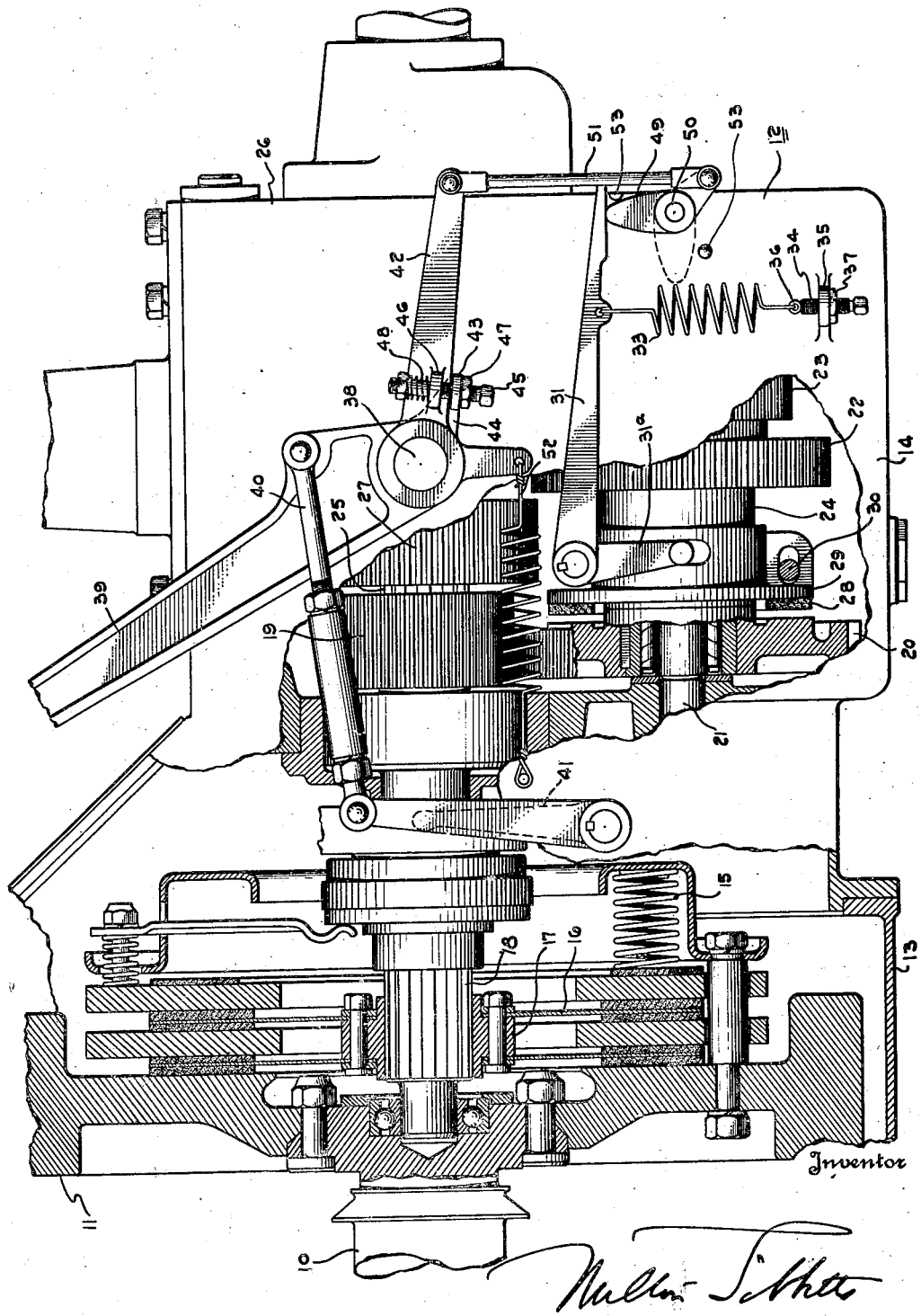
Inventor
Mullin Tibbetts Patented Oct. 2, 1934

1,975,626

UNITED STATES PATENT OFFICE 1,975,626

TRANSMISSION CONTROL MECHANISM

Milton Tibbetts, Detroit, Mich., assignor to Packard Motor Car Company, Detroit, Mich., a corporation of Michigan Application May 1, 1930, Serial No. 449,011

9 Claims. (Cl. 192—18)

This invention relates to motor vehicles and particularly to the transmission mechanism thereof. More specifically the invention relates to a clutch and a clutch brake mechanism and their operating and interconnecting linkages.

The need for a clutch brake has become increasingly evident in modern traffic wherein the occasion frequently arises for accelerating in low or second gear far beyond the normal range of such gears. Upon these occasions, it is often particularly desirable to be able to shift quickly, and without clashing the gears, to the next higher ratio and to continue the acceleration substantially without pausing while accomplishing the shift. With the present transmission there is required an appreciable period of delay, with the gear shift lever in neutral before the clutch and transmission parts associated therewith have slowed down to a speed which will permit shifting from neutral into the next higher ratio without objectionable gear clashing. The period of delay may be shortened by double clutching, but it is not in this way completely eliminated. Furthermore, double clutching requires considerable practice to accomplish well.

Several types of synchronizing mechanisms have also been proposed or adopted in an effort to shorten the operation of shifting gears. The clutch brake is perhaps one of the oldest synchronizing mechanisms of this sort. However, clutch brakes generally are undesirable because they involve the supplying of force by the operator of the vehicle in addition to that which must be supplied to disengage the clutch.

This requirement of additional force is very undesirable, and one of the objects of this invention is to provide a clutch brake which may be applied by the clutch pedal without necessitating any appreciable increase in pedal pressure.

As a corollary to this it is desired to provide a clutch brake mechanism which does not require any appreciable increase in the strength of the clutch retracting spring.

Some clutch brakes are so interconnected with the clutch operating mechanism that an adjustment of the linkage of the clutch tends to apply the brake somewhat. Another object of this invention is to provide a clutch brake which is independent of variations in the adjustment of the clutch operating mechanism. The operation of the clutch simply sets free other mechanism which then applies the brake and this mechanism remains constant.

These objects may be accomplished and applied to a standard transmission in many ways, but the one herein proposed, in which the brake is applied to the constant mesh gear on the transmission countershaft, is designed to be particularly simple in construction and operation, and is intended as a preferred illustration of a mechanism containing the features of this invention.

In the single figure of the drawing I have illustrated a side view of a clutch and transmission system embodying the invention, with parts cut away better to show the mechanism.

I have shown a crank shaft 10, a fly wheel 11 secured to the crank shaft, a transmission case 12 comprising a forward compartment 13 for the clutch, and a rearward or gear compartment 14. In accordance with customary practice, the clutch plates are pressed against the fly wheel 11 by the several springs 15 of which only one is shown. The driven clutch plates 16 are splined by any suitable hub construction 17 to one end of the clutch shaft 18, and rotate therewith. Clutch shaft 18 is supported by bearings in the usual manner and terminates at its rearward end in a gear 19 integral therewith, which gear is constantly engaged with the constant mesh gear 20 on the transmission countershaft 21. Gear 20, countershaft second speed gear 22, countershaft low speed gear 23, and reverse gear (not shown), are all fixed on sleeve 24 which is in turn supported by bearings on shaft 21.

Power passes through the transmission to the rear wheels by means of the splined transmission shaft 25, supported at one end by a bearing (not shown) inside the end of the clutch shaft 18, and near the other end by a bearing in the rear wall 26 of the transmission case, and from there to the splined universal joint, propeller shaft and rear axle, as is common practice. In high gear the direct connection between the clutch shaft and the transmission shaft is obtained by sliding the gear 27, which is splined to transmission shaft 25, over the end of gear 19, there being internal teeth on gear 27 which mesh with the external teeth on gear 19.

In second speed, power is transmitted from the clutch shaft 18 through gears 19, 20, sleeve 24 and gears 22 and 27 to the shaft 25. Low speed is obtained by the engagement of low speed gear 23 with a slidably splined gear (not shown) on shaft 25. Some synchronizing mechanisms do not provide for synchronization when shifting from low to second gears. There is, however, just as much need for it, and consequently this invention contemplates the provision of continually acting synchronizing means.

The action of this invention will be described when a shift from second to high is being made, but it will be readily understood that the action of the clutch brake will be the same when shifting out of low gear. When shifting gear 27 from second to high, in other words from its engagement with gear 22 to its engagement with gear 19, it is desirable to slow down the gear 19 in order that there may be no clashing between gears 27 and 19 at the instant of engagement. Gear 19 is, however, part of a system comprising clutch shaft 18 and transmission countershaft sleeve 24, so that the entire system must be slowed down, and, conversely, slowing down any part of the entire system will have the desired effect on gear 19.

The oil or grease in the transmission will have some effect on the rotation of this system but an additional brake is required. The construction in this case is a friction brake surface 28 which is adapted to be applied to the side of countershaft gear 20. The surface 28 is mounted on a brake shoe member 29 supported in the transmission case by a bolt 30 and held thereby against rotation about the sleeve 24. The brake shoe member 29 is moved axially along the sleeve 24 in order to apply the brake. This movement is provided by a yoke 31a and a lever arm 31 which are keyed on a shaft 32 rotatably secured in the transmission casing. The arm 31a is made to move the brake shoe 29 into braking position by means of spring 33 connected to arm 31 outside the casing thus making the application of the brake possible without requiring force from an external part of the system such as the clutch pedal. Spring 33 is mounted in any convenient fashion, and should be adjusted so that it will retard the rotation of, but not immediately stop, the clutch driven parts. As shown, the spring is attached to a bolt 34 mounted in a boss 35 on the outside of the transmission case 12, a swivel joint 36 connects the spring to the bolt. A lock nut 37 is used to hold the bolt at the proper adjustment. This adjustment makes it possible to control the action of the clutch brake so that the driven clutch parts will be slowed up until the linear speeds of the meshing gear teeth are equal.

To coordinate the action of the brake so that it is applied only when the clutch is disengaged, there is mounted pivotally at 38, and co-axially with the clutch pedal 39 which operates the clutch by means of adjustable link 40 and yoke 41, an arm 42 which is rotated about the axis 38 by means of a stop 43 mounted on an extension 44 of the clutch pedal. A bolt 45 extends through stop 43 and also through a boss 46 on arm 42 and has on it a lock nut 47 and a spring 48. With variations in the adjustment of the length of the clutch link 40, clutch lever 39 and consequently stop 43 will have a variable angular position about the pivot 38. Spring 48, and its adjustment by means of bolt 45 and its lock nut 47, takes up any play which would otherwise develop in the connection between extension 44 and arm 42, by virtue of an adjustment of the clutch link 40. Thus the clutch may be adjusted without necessitating a readjustment of the clutch brake operating mechanism.

Arm 42 rotates cam member 49, pivoted at 50, by means of link 51 connected to an extension of the cam. As shown in full lines in the drawing, the clutch brake is in released position, but when cam 49 is rotated to its dotted line position, which is done by disengaging the clutch and simultaneously with such disengagement, it is seen that the spring 33 is then free to move arm 31 and apply the clutch brake, and that this spring, when thus freed, is independent of the clutch, so that the clutch may be disengaged quickly or slowly. In either case the clutch brake will still operate in the manner dictated by the adjustment of the spring and is therefore standardized in its operation.

It is seen that there is no additional strength required in the clutch spring 15 or the clutch pedal retracting spring 52 to hold the brake off. Clutch springs 15 are the motive force for disengaging the clutch brake. They operate, through the linkage shown, to rotate the cam 49 to its vertical position, and such additional work as is required of them or of the clutch pedal retracting spring, due to the use of this clutch brake apparatus, is required only during the disengaging movement and none is required of these springs when this has been completed.

Stops 53 are provided on the wall of the transmission case to prevent movement of the cam member 49 in any but the 90 degree arc between the full and dotted position of the cam.

It should be noticed, bearing out one of the objects of the invention, that the only additional force required on the clutch pedal to accomplish the engagement of the clutch brake is the negligible amount caused by the friction of the cam 49 sliding on arm 31, and the friction in the joints of the arm 51.

Although this invention has been described in connection with certain specified embodiments, the principles involved are susceptible of numerous other applications, as will readily be seen by persons schooled in the art. The invention is therefore to be limited only as indicated by the scope of the appended claims.

What is claimed is:

1. In a power transmission system, a clutch mechanism, a clutch brake, and an automatically spring operated pivoted lever operating the clutch brake, the movement of which lever to brake applied position is controlled by the clutch mechanism, but without pressure against the clutch spring when the lever is in brake released position.

2. In a transmission mechanism, the combination of driving and driven shafts, a clutch connecting said shafts, spring means to close said clutch, a brake for the driven shaft, spring means operating the brake, an operating device for the clutch moved to its closed position by the clutch spring means, and connections causing retraction of the brake against the return of its spring means by the action of the clutch spring means moving the clutch to closed position but with no reaction against the clutch spring means after the clutch reaches closed position.

3. In a motor vehicle including a clutch, a driver controlled clutch operating mechanism and a transmission mechanism, the latter comprising a driving gear and a shaft driven therefrom, spring operated means associated with the driven shaft tending to stop rotation of the driving gear when the clutch is disengaged, said means being operated in conjunction with but not actually by the clutch operating mechanism.

4. In a power transmission system, a clutch, a clutch pedal, and linkage connecting the two, a clutch brake, a spring operated arm controlling the action of the clutch brake, and a cam governing the action of the spring operated arm, and forming a one-way acting connection between the arm and the clutch pedal.

5. In a power transmission system, a clutch, clutch operating mechanism, a clutch brake, power operated means to apply the clutch brake, and means controlled by the clutch operating mechanism for releasing the power.

6. In a power transmission system, a clutch, clutch operating mechanism, a clutch brake, means separate from the clutch operating mechanism tending to apply the clutch brake, and means operated by the clutch operating mechanism opposing said applying means.

7. In a power transmission system, a clutch, clutch operating mechanism, a clutch brake, spring means separate from the clutch operating mechanism tending to apply the clutch brake, and means operated by the clutch operating mechanism opposing said spring means.

8. In a power transmission system, a clutch, a clutch brake, relatively movable operating mechanisms for the clutch and brake, the clutch brake operating mechanism being connected to be placed in operative position by the clutch operating mechanism, and resilient means connected to the clutch brake operating mechanism to move it into brake applied position.

9. In a power transmission system, a clutch, clutch operating mechanism, a clutch brake, power operated means to apply the clutch brake, and means connected to the clutch operating mechanism and actuated thereby for rendering the power operated means effective and ineffective.

MILTON TIBBETTS.